Sept. 7, 1943.　　　J. W. SEAMAN　　　2,329,003
ELECTRIC SWITCH
Filed May 21, 1942　　　2 Sheets-Sheet 2
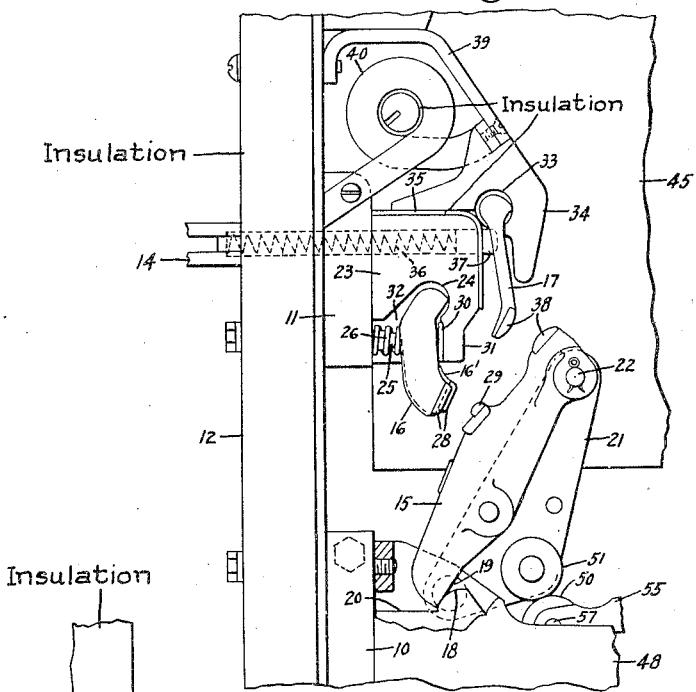
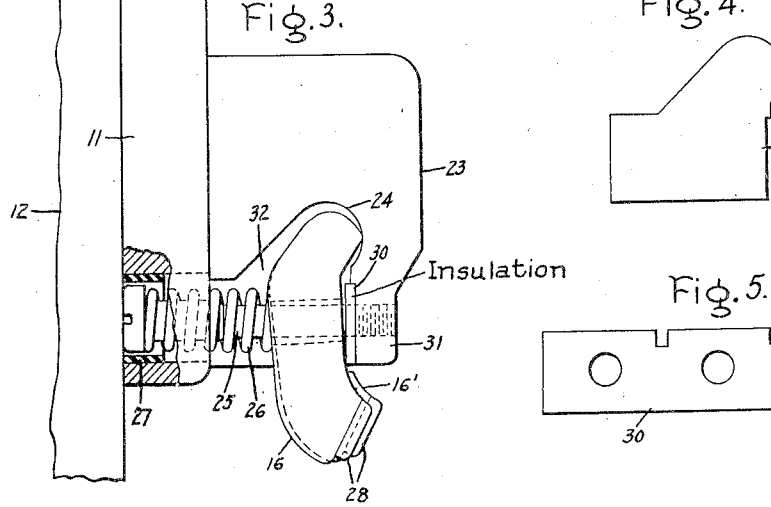
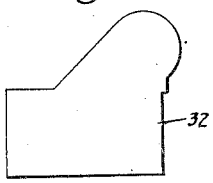
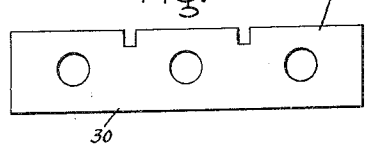
Inventor:
Joseph W. Seaman,
by Harry E. Dunham
His Attorney.

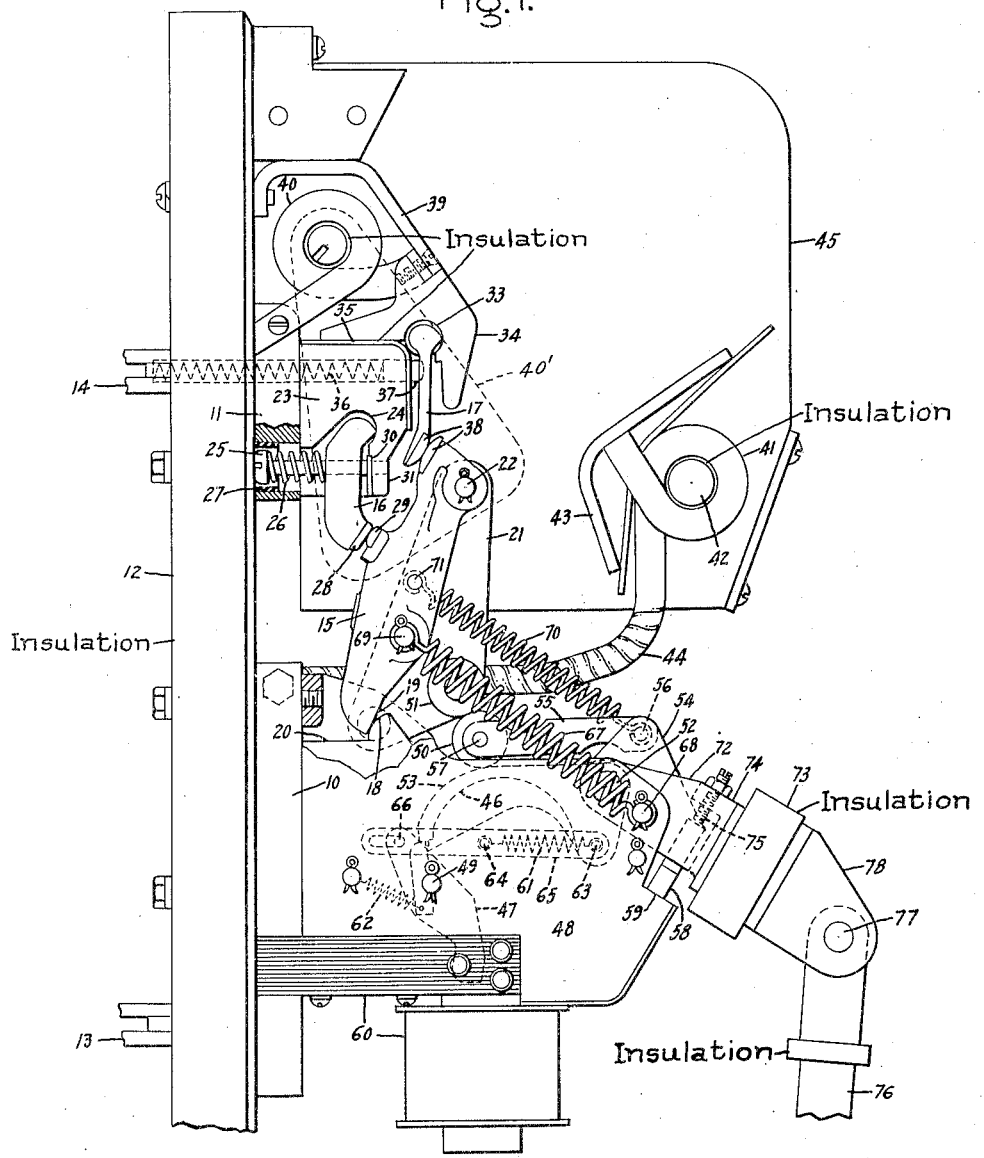

Patented Sept. 7, 1943

2,329,003

UNITED STATES PATENT OFFICE 2,329,003

ELECTRIC SWITCH

Joseph W. Seaman, Thornton, Del., assignor to General Electric Company, a corporation of New York Application May 21, 1942, Serial No. 443,878

14 Claims. (Cl. 200—87)

My invention relates to improvements in electric switches and more particularly high-speed circuit breakers, and especially circuit breakers which have a relatively high current-carrying capacity and yet operate to interrupt a direct current or rectified alternating current circuit whose current is increasing at a high rate before the magnitude of the current can attain dangerous values.

Probably the greatest trouble experienced in the operation of mercury arc rectifiers arises from abnormal operating conditions such as an arc-back occasioned by reverse current flow from cathode to anode or by the striking of an arc discharge between anodes. The reversal of current flow establishes a short circuit which is fed not only by the other rectifying paths of the particular rectifier, but also by all the rectifiers operating in parallel with this rectifier. The rate of increase of current in this short circuit path is so high, particularly in large installations, that currents dangerous to equipment and personnel and destructive of service continuity are quickly reached. There have been observed rates of increase of current of over six million amperes a second for a single rectifier and over eleven million amperes a second where several are operated in parallel. It is, therefore, imperative to interrupt this short circuit current very quickly if the current at interruption is not to exceed a safe value and interruption of service is to be prevented. In short, the problem is to interrupt the circuit of the faulty anode so quickly as to limit the resulting current to a safe value.

Even in normal parallel operation of rectifiers the pole units of the interrupting means must be able to carry relatively high currents because the poles of the circuit breaker carrying currents in the normal or forward direction during an arc-back are subjected to abnormally high current flow. The magnetic effect of such relatively high currents in the passage through the conducting path of the usual interrupting means tends to decrease the conductivity of the current path by reducing the pressure at the contacts. This can result in dangerous heating and burning of the contacts and may thus jeopardize the safety of the equipment. This is particularly true in circuit breakers embodying point or line contact action since high unit contact pressure is essential to high conductivity. On the other hand, when an interruption is desired at currents of fault value, such magnetic effect should expedite rather than delay the circuit interruption. Obviously, any circuit interrupting device which dependably fulfills the requirement of high-speed interruption and yet provides high conductivity at normal currents must also be economically feasible in order to be accepted by the art.

One object of my invention is to provide an improved circuit breaker, the inertia of the movable contact parts of which is reduced to a minimum consistent with the required current-carrying and interrupting capacities. Another object of my invention is to provide an improved circuit breaker structure in which flexible conductors such as pigtails and the like are unnecessary. Still another object of my invention is to provide an improved circuit breaker whose stationary and movable conducting parts are so arranged as to facilitate a quick opening operation. A further object of my invention is to provide an improved circuit breaker, the stationary and movable conducting parts of which are so arranged as to utilize the so-called magnetic loop expansion effect to increase the contact pressure and thereby to obtain better conductivity not only under normal circuit conditions but also in case of high current flow in a direction for which circuit opening is not desired and to expedite the circuit opening operation under such abnormal circuit conditions as require it. These and other objects of my invention will appear in more detail hereinafter.

In accordance with my invention, I reduce the weights of the moving contact elements in the circuit breaker and the frictional losses at the contact engaging surfaces to a minimum in order to obtain the quickest opening operation consistent with the necessary current-carrying and interrupting capacities. Also in accordance with my invention, I eliminate the use of flexible conductors, such as so-called pigtails and the like. Further in accordance with my invention, I so arrange the stationary and movable conducting elements of the circuit breaker relatively to each other and their positions in the current conducting loop through the circuit breaker that the magnetic loop expansion effect increases the pressure at the cooperating contact surfaces under normal conditions and accelerates the separation of the contacts when they should no longer be maintained in the circuit closing position, as in case of tripping during abnormal circuit conditions.

My invention will be better understood from the following description when considered in connection with the accompanying two sheets of drawings, and its scope will be pointed out in the appended claims.

In the accompanying drawings, Fig. 1 is a vertical side elevation, partly broken away and partly in section, of a circuit breaker embodying my invention; Fig. 2 is a partial elevation similar to Fig. 1 with the contacts in the circuit opening position; Fig. 3 is a fragmentary side elevation on an enlarged scale illustrating in detail the mounting of one of the contacts of the circuit breaker; and Figs. 4 and 5 are elevations of insulating pieces used in connection with the mounting shown in Fig. 3.

In the illustrated embodiment of my invention, I have shown an electric switch having a generally U-shaped current conducting loop comprising two spaced current conducting studs 10 and 11. These are mounted on a suitable supporting structure such as a panel 12 of suitable insulating material. The lower stud 10 includes a terminal 13 and the upper stud 11 includes a terminal 14. In accordance with my invention, I provide a movable contact 15 fulcrumed for movement about a given axis and one or more relatively stationary contacts 16 and 17 fulcrumed for movement each about its own independent axis and respectively engageable by the contact 15 between its axis and the respective axes of the contacts 16 and 17. The construction and arrangement of parts is such that the magnetic loop expansion effect consequent upon current conducted by the contacts tends to increase the pressures between their engaging portions and between the contacts and their supports and, also, to accelerate the circuit opening movement of the movable contact 15 when it is free to move to the circuit opening position.

In order to obtain the desired contact action, the contact 15 is, in accordance with my invention, mounted for rocking action about a stationary contact surface 18 which faces toward the inside of the loop so that the loop expansion effect forces the cooperating contact surface 19 of the contact 15 against the contact surface 18. This contact surface 18 is on a contact block 20 which forms a part of the stud 10. As shown, the contact surface 18 is curved and convexly so toward the inside of the loop. The surface 18 may be a cylindrical surface, as shown, and the cooperating contact surface 19 a plane surface, as shown. With this arrangement, I provide for the movable contact 15, in accordance with my invention, so as to minimize the scuffing and wear between the contact surfaces 18 and 19, a supporting means such as a cradle 21, which is pivotally supported for movement about an axis lying in the cylindrical contact surface 18. This axis is substantially the central element of the cylindrical surface 18. The contact 15 is pivotally supported on a pin 22 mounted in the upper end of the cradle 21. This cradle actually comprises two spaced side portions, one on each side of the contact 15. The one on the near side is omitted in the drawings for the sake of clearness in illustration.

In order to obtain multiple point contact or the equivalent thereof so as to conduct even higher transient currents, the bridging contact 15 may consist of a plurality of relatively thin, similar contacts, as disclosed, for example, in Letters Patent of the United States 2,302,394, issued November 17, 1942.

The stud 11 comprises a contact block 23 having a substantially cylindrical recess 24 in which the upper end of the contact 16 fits somewhat loosely. Actually, I prefer to make the contact 16 a plurality of separately spaced parallel contact elements or fingers 16 and 16', as shown more clearly in Figs. 2 and 3, with the intermediate contact finger 16' so shaped and biased as to provide a spaced sequence in engagement and separation by the contact 15 since this provides a better contact action. As shown in Fig. 3, the mounting for each contact element 16 and 16' includes a headed screw 25, which is supported in an opening in the stud 11 and screwed into the contact block 23. The headed screw 25 carries a contact biasing or backing spring 26. In order to maintain a sharp current loop at the contact recess 24, the head of the screw 25 is centered in the opening of the stud 11 by suitable insulating means such as a bushing 27 to prevent the passage of current from the block 23 through the screw 25 and the spring 26 to the stud 11. The bias of the backing spring 26 holds the upper end of the associated contact element 16 or 16' forward against the face of the recess 24 in line to line contact in the arrangement shown. For better contact action, the upper end of the contact elements 16, 16' and the surface of the recess 24 against which they bear may be silver faced. Likewise, the lower end of each of the contact elements 16, 16' is preferably provided with a contact piece 28 of suitable contact material such as, for example, as silver. These silver contact pieces 28 engage a silver contact piece 29 mounted on the movable contact 15. In order to prevent conduction except through the line to line engagement of the fingers 16, 16' in the recess 24, I further provide an insulating strip 30 between the contact fingers 16, 16' and the overhanging portion 31 of the contact block 23. The contact fingers 16, 16' are spaced slightly by insulating separators 32 in order that each finger may be free to move independently of the others under the magnetic attracting forces between them due to the currents flowing through them in the same direction. This arrangement permits the contact fingers 16, 16' to come to a better bearing in the contact recess 24, and similarly the contact pieces 28 come to a better bearing against the contact piece 29.

In accordance with my invention, the stationary or arcing contact 17 is mounted in a substantially cylindrical recess 33 in an arcing contact block 34, which is separated from the contact block 23 by suitable insulation 35. Like the contact fingers 16, 16', the contact 17 is biased forward to engage the arcing contact block 34 in line to line contact. For this purpose, I provide one or more backing springs 36, which are mounted in holes in the stud 11 and the contact block 23. The backing springs 36 do not engage the contact 17 directly but are spaced therefrom by insulating rods 37. The lower end of the contact 17 and the upper end of the movable contact 15 are provided with suitable contact engaging pieces 38.

For arc extinguishing purposes, the arcing contact block 34 is provided with an arcing horn extension 39 and is also connected to the stud 11 through a blowout coil 40. For carrying the end of the arc off from the contact portion 38 of the movable contact 15, I provide a blowout coil 41 having a suitable core 42. This coil is connected between an arcing horn 43 and the lower stud 10 of the circuit breaker through a conductor 44. This arc extinguishing structure further includes pole pieces 40', only one of which is shown, for the core of the coil 40 and two enclosing barriers 45, only one of which appears in the drawings.

In order to move the cradle 21 into and maintain it in the circuit closing position and yet have it quickly freed for high-speed interruption, suitable operating means is provided. The particular means illustrated comprises a movable abutment 46, releasable means comprising a latch 47 pivoted in the circuit breaker frame 48 at 49 for holding the abutment in a predetermined position, and actuating means comprising a member 50 movable over the face 53 of the abutment 46 and between the abutment and a member 51 movable with the contact 15, for example, pivoted on the cradle 21. In order to minimize friction and facilitate high-speed operation, the members 50 and 51 are rollers, as shown. The abutment 46 is mounted on a pivot 52 extending between the sides 48 of the circuit breaker frame. In order to obtain the counterclockwise movement of the cradle 21 necessary to bring the contact 15 into the normal current conducting position, the abutment 46 is provided with a suitably shaped cam face 53.

For actuating the roller 50, there is provided an operating member 54, which is mounted on the pivot 52 and is connected to the roller 50 through one or more operating links 55. These links are pivoted to the operating member 54 at 56 and to the roller 50 at 57. The operating member 54 comprises two side pieces 54 and a cross connection 58, which in the closed position of the circuit breaker abuts the frame 48 at 59, as shown in Fig. 1. In order to maintain the circuit breaker in the closed position as long as the abutment 46 is maintained in the latched position, the parts are so proportioned and arranged that in the closed position of the circuit breaker the direction of pressure on the roller 50 tends to force this roller to the right on the cam surface 53.

For controlling the latch 47 so as to effect the opening of the circuit breaker in response to predetermined abnormal conditions of the circuit controlled thereby, suitable electromagnetic means 60 are provided, but since this means constitutes no part of my present invention, further discussion is unnecessary.

For resetting the abutment 46 and latch 47 to the sustaining position, there are provided abutment return springs 61 and a latch returning spring 62. The former are secured to the abutment at a point 63 and to the frame at 64 and tend to turn the abutment clockwise about its pivot 52. The latch return spring 62 is connected between the latch 47 and the frame 48 and tends to turn the latch clockwise about its pivot 49. The relative rotations of the abutment 46 and its sustaining latch 47 are limited by an interconnecting link 65, which has one end pivoted to the abutment at 63 and the other end pivoted to the latch 66 in a lost motion slot of the link 65.

For quickly moving the contact 15 to the opening position and exerting pressure between the contact surfaces 18 and 19 at all times, there are provided suitable energy storing means such as biasing springs 67, only one of which appears in the drawings. These springs are positioned outside of the cradle 21. In order to have them suitably stressed during the closing movement of the circuit breaker, they are connected between a stud 68 supported in the sides of the frame 48 and a rod 69 fixed in the movable contact 15 but extending through slotted openings, not shown, in the cradle sides 21 so as to permit a predetermined movement of the contact 15 relatively to the cradle 21. For exerting pressure between the contact surfaces 18 and 19 at all times and also returning the operating member 54 and the parts connected thereto into position in preparation for reclosing the circuit breaker, there is provided suitable energy storing means such as a biasing spring 70. In order that this spring may be suitably stressed during the closing movement of the circuit breaker, it is connected between the pivot 56 and a rod 71 fixed in the contact 15, which is provided with a hollow portion for receiving the end of the spring.

Since mercury arc rectifiers usually have six anode circuits and sometimes more, the operating mechanism illustrated provides an arrangement whereby a plurality of single-pole circuit breakers in the open circuit position can be closed simultaneously, and also any one or more poles can open and can be closed without interfering with the poles that are closed whereby to avoid unnecessary interruptions in sound anode circuits. For this purpose, each pole comprises an actuating lever 72. These are interconnected by a common actuating means comprising a crossbar 73. As shown, the actuating lever 72 is U-shaped with a cross piece 74 having a projection 75 arranged to abut the cross piece 58 of the operating crank 54. In order to insure that each pole will be positively closed, the projection 75 is adjustably positioned so as to take care of manufacturing tolerances and variations in lost motion whereby to insure the desired closing action of any one or more poles even though the others are closed. The projection 75 is so adjusted that a predetermined clockwise movement of the actuating lever 74 will impart sufficient clockwise movement to the operating crank 54 to effect the holding bias of the rollers 50 and 51. This will, in general, cause the operating crank 54 to settle with its cross piece 58 abutting the frame 41 at 59 with some clearance between the projection 75 and the cross piece 58. It is, however, possible that the final holding bias position of the crank 54 may be reached at the end of the clockwise movement of the actuating lever 74. In this case, the projection 75 may continue to abut the operating crank cross piece 58. The crossbar 73 may be actuated to effect the turning of the actuating lever 74 to reset the circuit breaker mechanism and close the circuit breaker by a suitable power or otherwise operated means acting on a rod 76 pivoted at 77 on a crank 78 secured to the crossbar 73.

Considering now the main conducting path through the primary relatively stationary contact 16 and the movable contact 15, it will be apparent that these two contacts are in series in a current conducting loop which includes the terminal 13, the stud 10, the stud contact block 20, the portion of the movable contact 15 between its engagement with the contact block 20 and the contact faces 28 of the contact 16, the contact fingers 16 and 16', the contact block 23 of the stud 11, the stud 11, and the terminal 14.

Inasmuch as the curved contact surface 18 faces toward the inside of this loop, it will be apparent that any magnetic loop expansion effect due to current flowing through the conducting loop just traced will force the contact surface 19 of the contact 15 against the contact surface 18 with a pressure dependent upon the magnitude of the magnetic loop expansion effect. Similarly, because of the pendulous mounting of the relatively stationary contact 16, the magnetic loop expansion effect tends to force the lower end of this contact with its contact surfaces 28 against the contact surface 29 on the movable contact 15 and, also, to force the upper end of the contact 16 against the contact surface 24 in the contact block 23. Thus, as long as the contact 15 is held by the operating mechanism above described, the greater the current flowing through the loop, the greater the contact pressure between the contact surfaces 28 and 29 and, also, between the upper end of the contact fingers 16, 16' and the contact surface 24 in the contact block 23. In other words, the greater the current flowing through the loop of which the contacts 15 and 16 constitute a part, the greater the contact pressure at all the contacting portions as long as the mechanism maintains the contacts in the closed position.

Considering now the arcing contact 17 in relation to the movable contact 15, it will be observed that these contacts are in a conducting loop comprising the terminal 13, the stud 10, the contact block 20, the contact surfaces 18 and 19, the movable contact 15, the contact surfaces 38, the contact 17, the contact recess 33 in the arcing contact block 34, the blowout coil 40, the stud 11, and the terminal 14. Again, in consequence of the pendulous suspension of the contact 17 with contact between the surfaces 38 intermediate the axes of rotation of the contacts 15 and 17, the magnetic loop expansion effect consequent upon current through the conducting loop just traced tends to increase the contact pressure between the contact surfaces 38 and between the upper end of the contact 17 and the contact recess 33. The greater the current through the loop, the greater the contact pressure as long as the contact 15 is prevented from moving.

Since in case of an arc-back the other or sound anode circuits are subjected to heavy current flow, it is obvious that circuit breakers embodying my invention will not blow open because the increase in the loop expansion effect by virtue of the increase in current merely serves to intensify the contact pressure and thus provides better conductivity. Accordingly, circuit breakers embodying my invention are particularly suitable for the protection of the anode circuits of mercury arc rectifiers because of this contact pressure feature as well as the accelerated high-speed opening which is produced by the magnetic loop expansion effect. It is to be understood, however, that the application of my invention is not limited solely to circuit breakers for the protection of mercury arc rectifiers since it will be apparent to those skilled in the art that it can be used wherever desired and, in particular, where circuit breakers have to carry currents in excess of their normal rated capacity for relatively short periods.

However, when for any reason the abutment 46 is released, as by virtue of the operation of electro-responsive means 60 to effect the release of the latch 47, the contact 15 is free to move to the circuit open position shown in Fig. 2. Inasmuch as each of the relatively stationary contacts 16 and 17 has a certain limited counter-clockwise movement about its contact axis, these contacts are free to follow the movable contact 15 momentarily and impart thereto by virtue of the magnetic loop expansion effect an accelerated movement in the circuit opening direction whereby to expedite the circuit opening operation. In this circuit opening operation, the sequence of breaking is first, between the contact surface 28 of the contact finger 16 and the contact surface 29 of the movable contact 15; second, between the contact surface 28 of the contact finger 16' and the contact surface 29 of the movable contact 15; and last, between the contact surfaces 38 of the arcing contact 17 and the movable contact 15. Throughout all of this movement, it will be observed that as long as any current flows through the loops including either the contact 16 or the contact 17, the magnetic loop expansion effect continues to increase the contact pressure between the stationary contact surface 18 and the contact surface 19 of the movable contact 15 because the contact surface 18 faces toward the inside of the loop in such a manner that any tangential component of pressure tending to slide the contact 15 off from the contact surface 18 is exerted on the pin 22 which is constrained to move about the pivotal axis of the cradle 21. Accordingly, this tangential component of pressure cannot effect relative movement of the contact surfaces 18 and 19. In other words, the pressure between the contact surfaces 18 and 19 is directed in such a manner as to maintain good contact at these surfaces without causing any sliding action or scuffing thereof in consequence of the loop expansion effect.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. An electric switch comprising a plurality of relatively movable cooperating conducting members mounted to form a generally U-shaped current conducting loop when the switch is closed, said members being so arranged that the magnetic expansion effect of current through the loop formed by the members tends to increase the pressure at the engaging portions thereof, said members comprising two spaced current conducting studs, a first contact fulcrumed in one of said studs for movement relatively thereto, a contact surface on the other stud facing toward the inside of the loop, a movable contact having a contact surface cooperating with the contact surface on said other stud, and means supporting said movable contact for movement on the contact surface of said other stud into engagement with said first contact intermediate said studs.

2. An electric switch having a generally U-shaped current conducting loop comprising two spaced current conducting studs, a first contact fulcrumed in one of said studs for movement relatively thereto, a convex contact surface on the other stud facing toward the inside of the loop, a movable contact having a contact surface cooperating with said convex contact surface, and movable means supporting said movable contact with the cooperating contact surface thereon in rocking engagement with said convex contact surface, said movable contact engaging said first contact intermediate said studs upon actuation of said movable supporting means in a direction to complete the loop.

3. An electric switch having a generally U-shaped current conducting loop comprising two spaced current conducting studs, a first contact fulcrumed in one of said studs for movement relatively thereto, a cylindrical contact surface on the other stud facing toward the inside of the loop, a support pivotally mounted for movement about an axis lying in said cylindrical surface, a contact pivotally mounted on said support and having a plane contact surface in rocking engagement with said cylindrical contact surface, said movable contact engaging said first contact intermediate said studs upon movement of said support in one direction.

4. An electric switch comprising a stationary contact surface, a pivotally supported contact having a contact surface in rocking engagement with said stationary contact surface, and a relatively stationary contact fulcrumed for movement about an axis and engageable by said pivotally supported contact between the axis of said relatively stationary contact and the engaging portions of said contact surfaces, the position of said axis and the positioning of said contact surfaces being such that the magnetic loop expansion effect consequent upon current conducted by said contacts tends to increase the pressure between the engaging portions of said contacts and between said contact surfaces and also to accelerate the circuit opening movement of the pivotally supported contact when this contact is free to move to the circuit opening position.

5. An electric switch comprising a stationary curved contact surface, a support pivoted for movement about an axis lying substantially in said curved contact surface, a movable contact pivotally mounted on said support and having a contact surface in rocking engagement with said curved contact surface as said support is turned about its axis, and a relatively stationary contact fulcrumed for movement about an axis spaced from the axis of said support and engageable by said movable contact between said axes, the arrangement of said axes and the positioning of said contact surfaces being such that the magnetic loop expansion effect consequent upon current conducted by said contacts tends to increase the pressure between the engaging portions of said contacts and between said contact surfaces and also to accelerate the circuit opening movement of the pivotally supported contact when this contact is free to move to the circuit opening position.

6. An electric switch comprising a conductive stud having a substantially cylindrical contact surface, a support pivoted for movement about a given axis lying substantially in said cylindrical contact surface, a main contact pivotally mounted on said support and having a substantially plane contact surface in rocking engagement with said cylindrical contact surface as said support is turned about its axis, and primary and secondary contacts fulcrumed for movement each about its own independent axis and respectively engageable by said main contact between said given axis and the respective axes of the primary and secondary contacts, the arrangement of said axes and the positioning of said cylindrical and plane contact surfaces being such that the magnetic loop expansion effect consequent upon current conducted by said contacts tends to increase the pressure between the main contact and the primary and secondary contacts and between said plane and cylindrical contact surfaces and also to accelerate the circuit opening movement of the main contact when this contact is free to move to the circuit opening position.

7. An electric switch having a generally U-shaped current conducting loop comprising two spaced current conducting studs, a first contact fulcrumed in one of said studs for movement relatively thereto, a contact surface on the other stud facing toward the inside of the loop, and a movable contact having a contact surface cooperating with the contact surface on said other stud, and a second generally U-shaped current conducting loop comprising said studs, an arcing contact block mounted on but insulated from said one of said studs, an arcing contact fulcrumed in said arcing contact block for movement relatively thereto, and a current conducting member between said arcing contact block and said one stud, and means supporting said movable contact for movement on the contact surface of said other stud into engagement sequentially with said first contact intermediate said studs and then with said arcing contact intermediate said other stud and said arcing contact block.

8. An electric switch having two generally U-shaped electrically parallel current conducting loops, one of said loops comprising two spaced current conducting studs, one of which includes a contact block, a first contact fulcrumed in said contact block for movement relatively thereto, a convex contact surface on the other stud facing toward the inside of said two loops, a movable contact having a contact surface cooperating with said convex contact surface, and the other of said loops comprising an arcing contact block mounted on said one contact block, a conductive connection between said arcing contact block and said one stud, an arcing contact fulcrumed in said arcing contact block for movement relatively thereto, and movable means supporting said movable contact with the cooperating contact surface thereon in rocking engagement with said convex contact surface, said movable contact engaging said arcing contact and said first contact in a predetermined sequence upon actuation of said movable supporting means in a direction to complete said loops.

9. A circuit breaker comprising two spaced current conducting studs, two relatively stationary contacts respectively mounted in current conducting relation with one of said studs to turn about spaced pivotal axis and biased in one direction for a limited turning movement, a main contact mounted for turning in the opposite direction into current conducting engagement with both of said relatively stationary contacts to complete electrically parallel current conducting loops through said studs, the mounting for said main contact comprising a substantially cylindrical contact surface on the other of said studs facing toward the inside of said loops, a support pivoted for movement about an element of said cylindrical contact surface, and a pivot on said support for said main contact arranged to permit rocking movement thereof on said cylindrical surface upon actuation of said support, the arrangement being such that the magnetic loop expansion effect consequent upon current conducted by the three contacts in the electrically parallel conducting loops tends to increase pressures between the engaging portions of the contacts and between the contacts and their respectively associated studs and, also, to accelerate the circuit opening movement of the main contact when it is free to move to the circuit opening position.

10. An electric switch comprising upper main and arcing contact blocks and a lower contact block, means for conducting current between said lower contact block and said upper main and arcing contact blocks comprising two relatively low mass movable contacts respectively in contacting engagement with said upper main and arcing contact blocks, a movable contact of relatively low mass in contact engagement with said lower contact block movable into engagement to complete a conducting path between said lower contact block and said main and arcing contact blocks first to engage the movable contact in contacting engagement with the arcing contact block and then to engage the movable contact in contacting engagement with the main contact block, said movable contacts being so constructed and arranged that while the switch is closed, the magnetic loop expansion effect due to current flow through the contacts tends to increase the contact pressure at their contact engaging portions and to facilitate current transfer from the main contact block to the arcing contact block during the circuit opening movement of the contacts.

11. An electric switch comprising a plurality of relatively movable cooperating conducting members mounted to form a generally U-shaped current conducting loop when the switch is closed, said members being so arranged that the magnetic expansion effect of current through the loop formed by the members tends to increase the pressure at the engaging portions thereof, said members comprising two spaced current-conducting studs, a contact surface on each stud facing toward the inside of the loop, and movable cooperating contacts respectively fulcrumed on said contact surfaces.

12. An electric switch comprising a plurality of relatively movable cooperating conducting members mounted to form a generally U-shaped current conducting loop when the switch is closed, said members being so arranged that the magnetic expansion effect of current through the loop formed by the members tends to increase the pressure at the engaging portions thereof, said members comprising two spaced current-conducting studs, a contact surface on each stud facing toward the inside of the loop, and contacts respectively fulcrumed on said contact surfaces and engageable with each other intermediate said studs to complete a conducting path therebetween.

13. An electric switch having a generally U-shaped current-conducting loop comprising two spaced current-conducting studs, one of said studs having a cylindrical contact surface concave toward the inside of said loop and the other of said studs having a cylindrical contact surface convex toward the inside of the loop, and movable cooperating contacts respectively mounted for movement on said cylindrical contact surfaces.

14. An electric switch having a generally U-shaped current-conducting loop comprising two spaced current-conducting studs, one of said studs having a cylindrical contact surface concave toward the inside of said loop and the other of said studs having a cylindrical contact surface convex toward the inside of the loop, and a plurality of contacts respectively fulcrumed on said cylindrical contact surfaces and engageable intermediate said studs to complete a conducting path therebetween.

JOSEPH W. SEAMAN.